US007988575B2

(12) United States Patent
Huang

(10) Patent No.: US 7,988,575 B2
(45) Date of Patent: Aug. 2, 2011

(54) DRIVING MECHANISM FOR LABELING MACHINE

(76) Inventor: Fu-Chuan Huang, Chiayi County (TW)

( * ) Notice: Subject to any disclaimer, the term of this patent is extended or adjusted under 35 U.S.C. 154(b) by 322 days.

(21) Appl. No.: 12/412,367

(22) Filed: Mar. 27, 2009

(65) Prior Publication Data

US 2010/0248877 A1 Sep. 30, 2010

(51) Int. Cl.
*F16H 7/12* (2006.01)
(52) U.S. Cl. ........................................ 474/136; 474/137
(58) Field of Classification Search .................. 474/101, 474/136, 137
See application file for complete search history.

(56) References Cited

U.S. PATENT DOCUMENTS 5,058,507 A * 10/1991 Muth ............................ 105/105
5,261,860 A * 11/1993 Takei ............................ 474/139
6,070,399 A * 6/2000 Huang et al. .................... 53/585
2009/0005203 A1* 1/2009 Nowakowski et al. ........ 474/136
2010/0242648 A1* 9/2010 Huang ............................ 74/396

* cited by examiner

*Primary Examiner* — Sang Kim
(74) *Attorney, Agent, or Firm* — Muncy, Geissler, Olds & Lowe, PLLC

(57) ABSTRACT

A driving mechanism for a labeling machine aims to drive a transmission assembly thereof from a power source through a linking member such as a belt. The transmission assembly concurrently drives rotation of an axle assembly so that a feeding wheel coupled on an axle can draw and convey a roll of film. A belt with teeth formed on two sides serves as a transmission member of the transmission assembly to transmit rotation to two axle wheels. The transmission assembly can transmit rotation accurately, rapidly and concurrently. The structure of the transmission assembly is simplified. Wearing can be reduced. Repair and maintenance also are easier.

8 Claims, 7 Drawing Sheets

DRIVING MECHANISM FOR LABELING MACHINE

FIELD OF THE INVENTION

The present invention relates to a driving mechanism for labeling machine that uses belts as transmission members in a transmission assembly to perform high speed transmission and offers easy maintenance.

BACKGROUND OF THE INVENTION

The driving mechanism of a conventional labeling machine, referring to FIG. 1, has a transmission assembly 1*a* consisting of a plurality of pulleys 12*a* coupled with linking bars 11*a* and belts 13*a*, and axles 14*a* with an adjustable width to mate a center guide post holding label films of varying dimensions.

The conventional labeling machine also has a linking belt 15*a* to link a driving wheel 10*a* and a linking pulley 16*a*. A pulley shaft 17*a* is provided to connect to the pulley 12*a* on the linking bars 11*a*. The pulleys 12*a* at two ends of the linking bars 11*a* are transmitted by the belts 13*a*. The pulleys 12*a* on the neighboring linking bars 11*a* are coupled on the pulley shaft 17*a*. Thus the linking bars 11*a* and the belts 13*a* are linked in a selected order. During repair and maintenance, the belts 13*a* cannot be removed and displaced individually. All the belts 13*a* at the front end and rear end have to be disassembled, then assembled and installed again in the selected order. It takes a great deal of time. Moreover, the belts 13*a* between the linking bars 11*a* of the transmission assembly 1*a* have to be wound in a staggered manner to prevent mutual friction. Hence a greater space is needed. As the tension of the belts 13*a* varies, transmission speed also is uneven and transmission quality is affected. Furthermore, the adjustment mechanism comprising the linking bars 11*a* can only be anchored on the junction of the linking pulley 16*a* and the axle 14*a*, and the rest elements are suspended. Hence shaking frequently occurs on the linking bars 11*a* that further impacts transmission effect of the belts 13*a*. This results in a shortened life span of the elements. There are still rooms for improvement.

In short, the driving mechanism of the conventional labeling machine still has many drawbacks in practice, notably:

1. A greater number of belts are needed. Replacement of the belts is tedious and wastes a lot of manpower and time.
2. The transmission elements occupy a great deal of space and result in difficult space configuration.
3. The belts are numerous and their tension is difficult to control, and result in uneven speed.
4. The transmission elements have many moving hinges. Shaking takes place and steadiness suffers.

SUMMARY OF THE INVENTION

The primary object of the present invention is to overcome the problems of the driving mechanism of the conventional labeling machine such as difficulty of maintenance and replacement of belts. The present invention provides a single transmission member to couple and transmit two axle wheels of a transmission assembly located on a base of a labeling machine. A linking member may be a belt to concurrently transmit a plurality of transmission assemblies. Each transmission assembly requires only one transmission member and one linking member. Assembly and repair and maintenance are easier.

To achieve the foregoing object, the present invention provides a driving mechanism for labeling machine that has a linking assembly driven by a driving wheel connected to a power source to drive a transmission wheel of a transmission assembly, and a transmission member engaged with the transmission wheel so that two axle wheels are rotated concurrently in opposite direction. A pushing wheel is provided adjacent to the axle wheels to form close engagement between the linking member and the axle wheels. In addition, the two axle wheels and pushing wheel are respectively installed on two sliders of a base. The sliders can keep the axle wheels steady without wobbling during rotation. With two sets of axles firmly mounted on the axle wheels, the distance between the two axles can be adjusted through an axle adjustment assembly. Therefore, the distance between two feeding wheels also can be adjusted.

The invention provides three main features: first, through the two slidable sliders, the distance between the two sliders can be adjusted without changing the location of the transmission member, thus it can be incorporated with center posts of varying dimensions. Second, coupling of multiple transmission assemblies can be done by linking the linking wheels thereof through a linking member so that the transmission assemblies can be driven concurrently. Third, each element is independently installed. If replacing one element is required, it can be accomplished by merely unfastening the transmission member. The moving elements need only lubrication by dispensing lube oil regularly. Life span of the elements and machine can be enhanced.

In short, the invention provides many benefits, notably:

1. Linking structure is simpler and can be incorporated with the center posts of varying dimensions.
2. The transmission wheels, driven wheels, axle wheels and pushing wheels of the transmission assembly are coupled and transmitted through the transmission members. Operation is steadier and quieter with less shaking or vibration.
3. Multiple sets of transmission assemblies can be coupled in series according to requirements. And the transmission members and linking members are independent and can be replaced easily.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
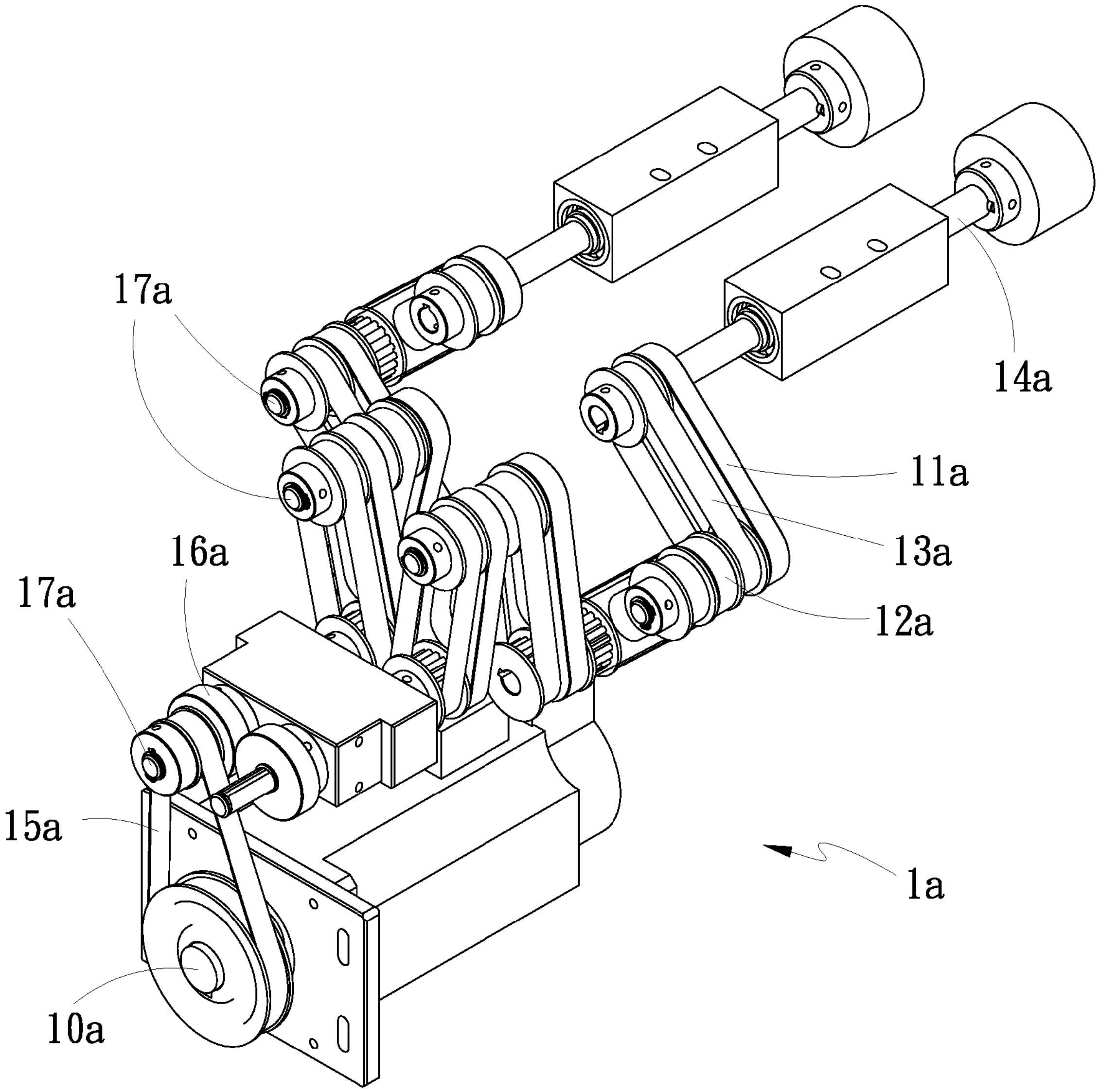
Fig. 1 PRIOR ART
FIG. 1 is a perspective view of the driving mechanism of a conventional labeling machine.

Please refer to FIGS. 2 through 5, the driving mechanism for labeling machine according to the invention is connected to a power source such as an electric motor and includes a driving wheel 3 formed with teeth, a base 4, a linking assembly 5, a transmission assembly 6, an axle assembly 7 and an adjustment assembly 8.

Figure 3:
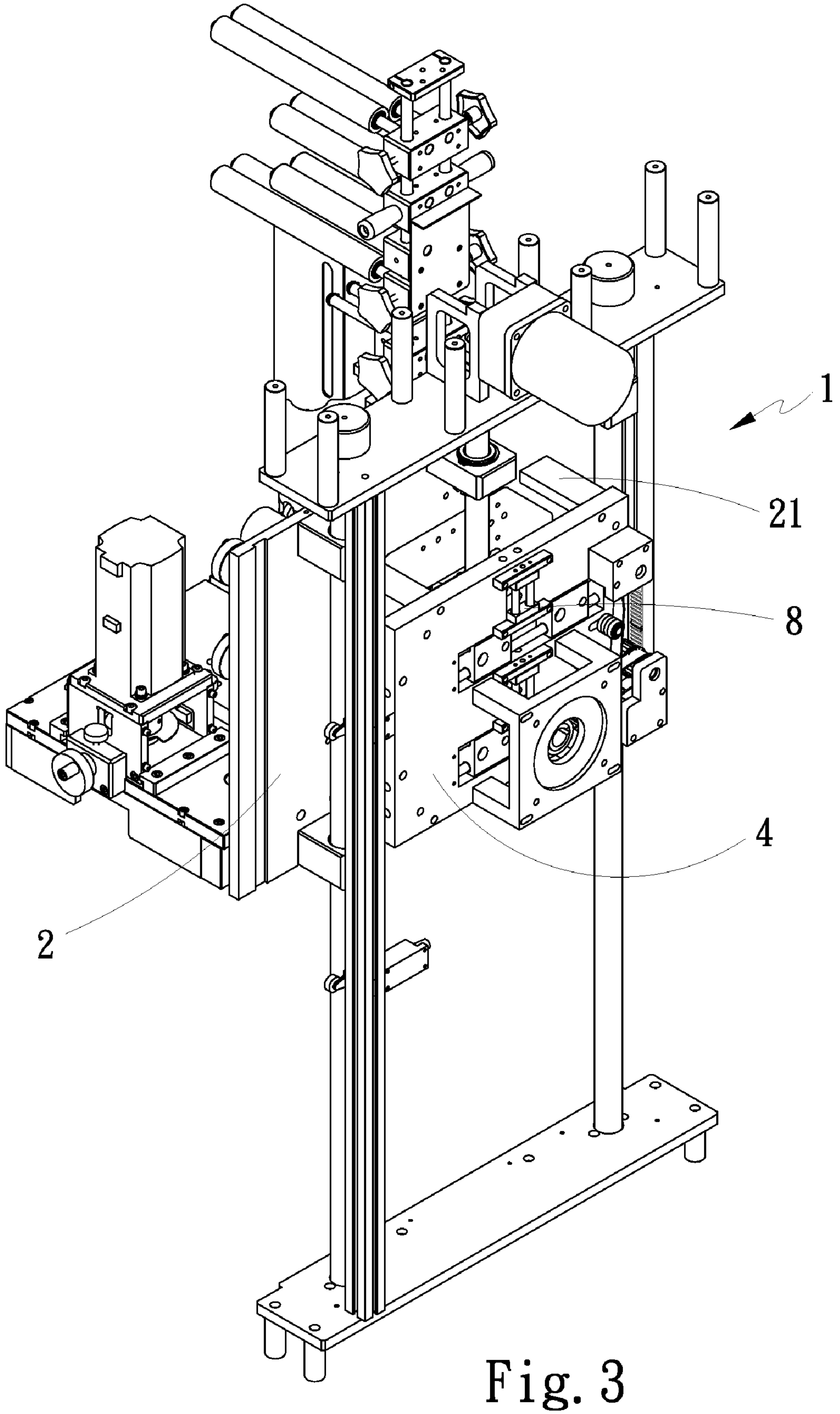
FIG. 3 is a rear view of the labeling machine of the invention.
Figure 6:
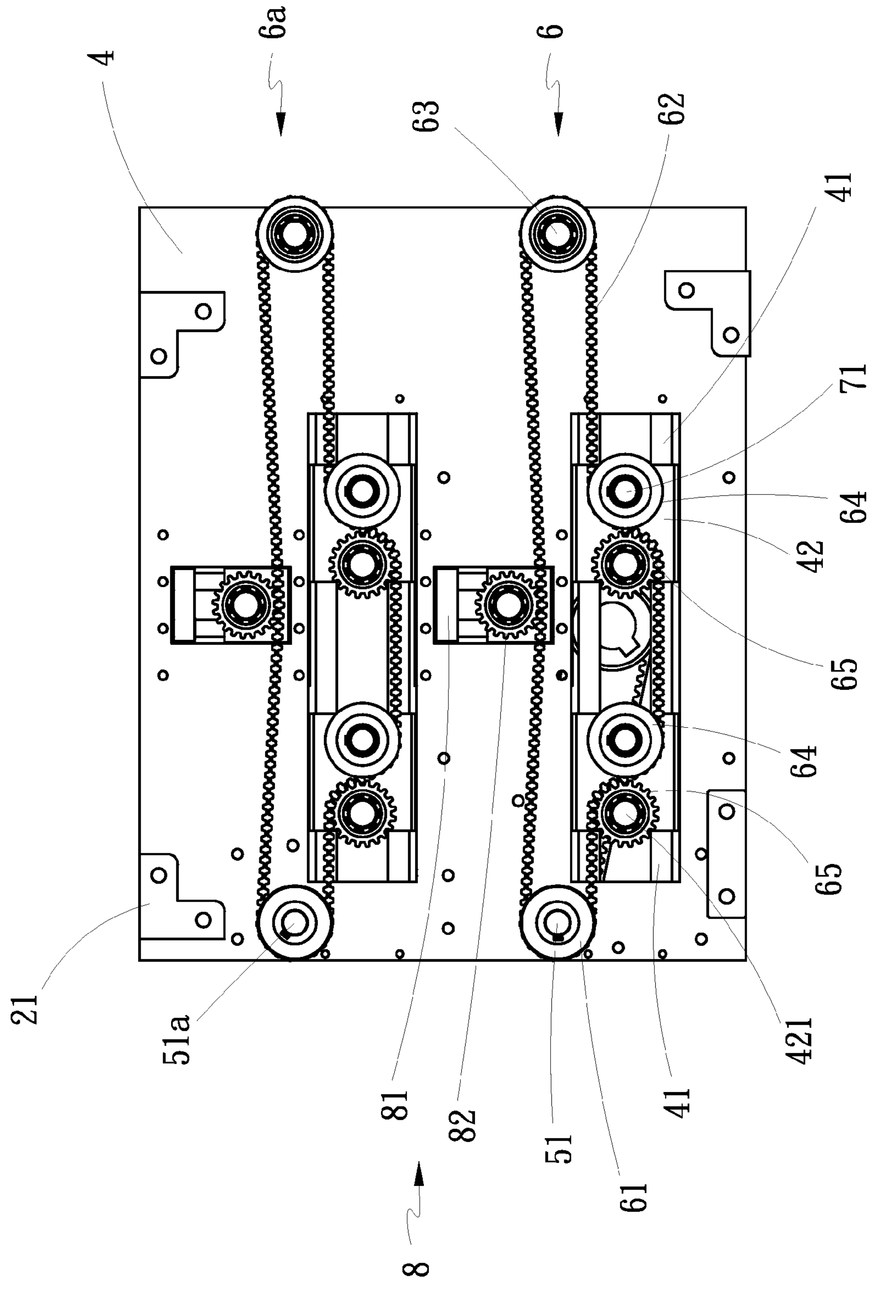
FIG. 6 is a front view of the driving mechanism of the labeling machine of the invention.

Also referring to FIGS. 3 and 6, the base 4 is fastened to a chassis 2 of a labeling machine 1 through an angular post 21 and has at least one sliding track 41 holding two sets of sliders 42 corresponding to each other. An anchor dock 421 is mounted onto the sliders 42.

Figure 4:
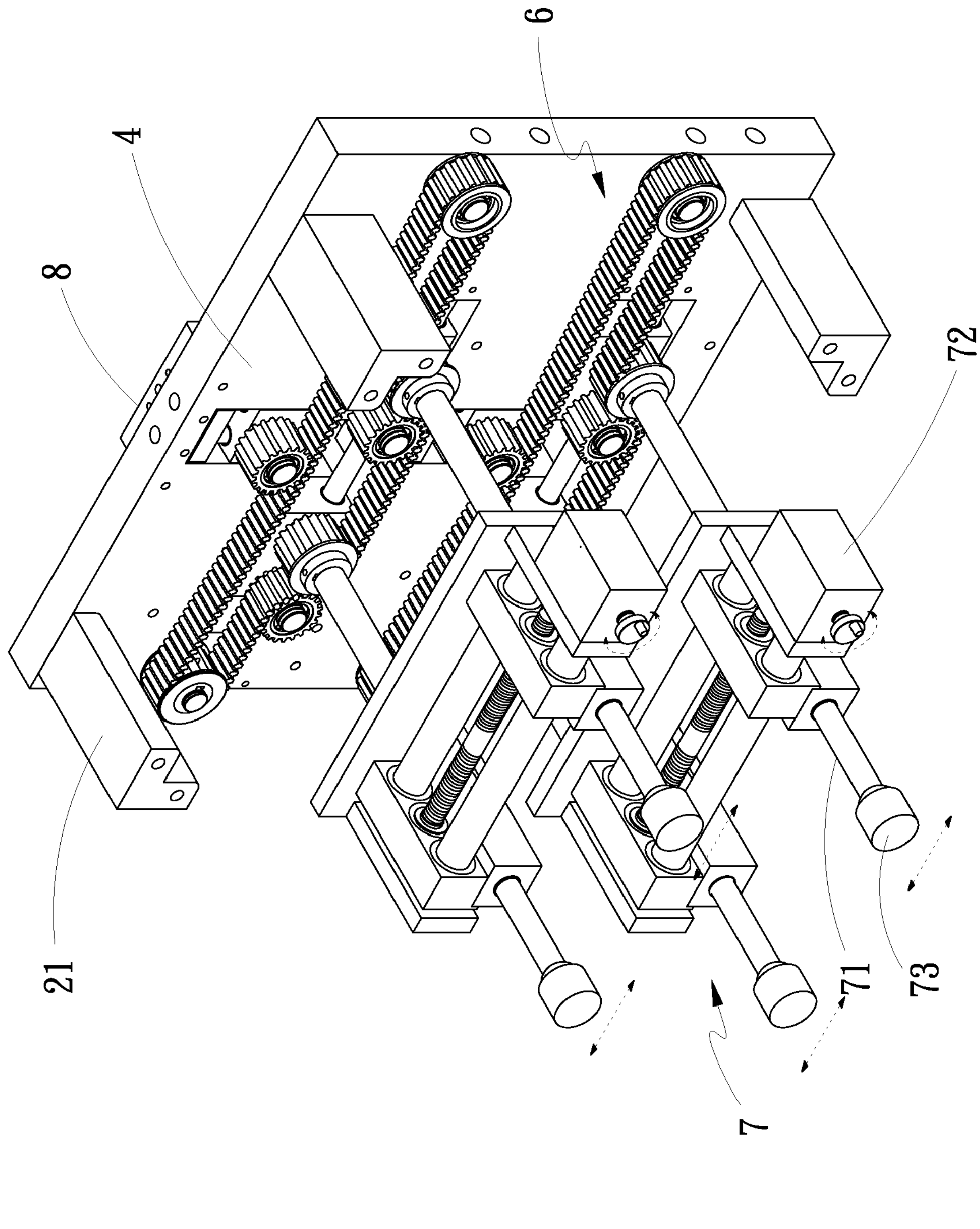
FIG. 4 is a perspective view of the driving mechanism of the labeling machine of the invention.
Figure 5:
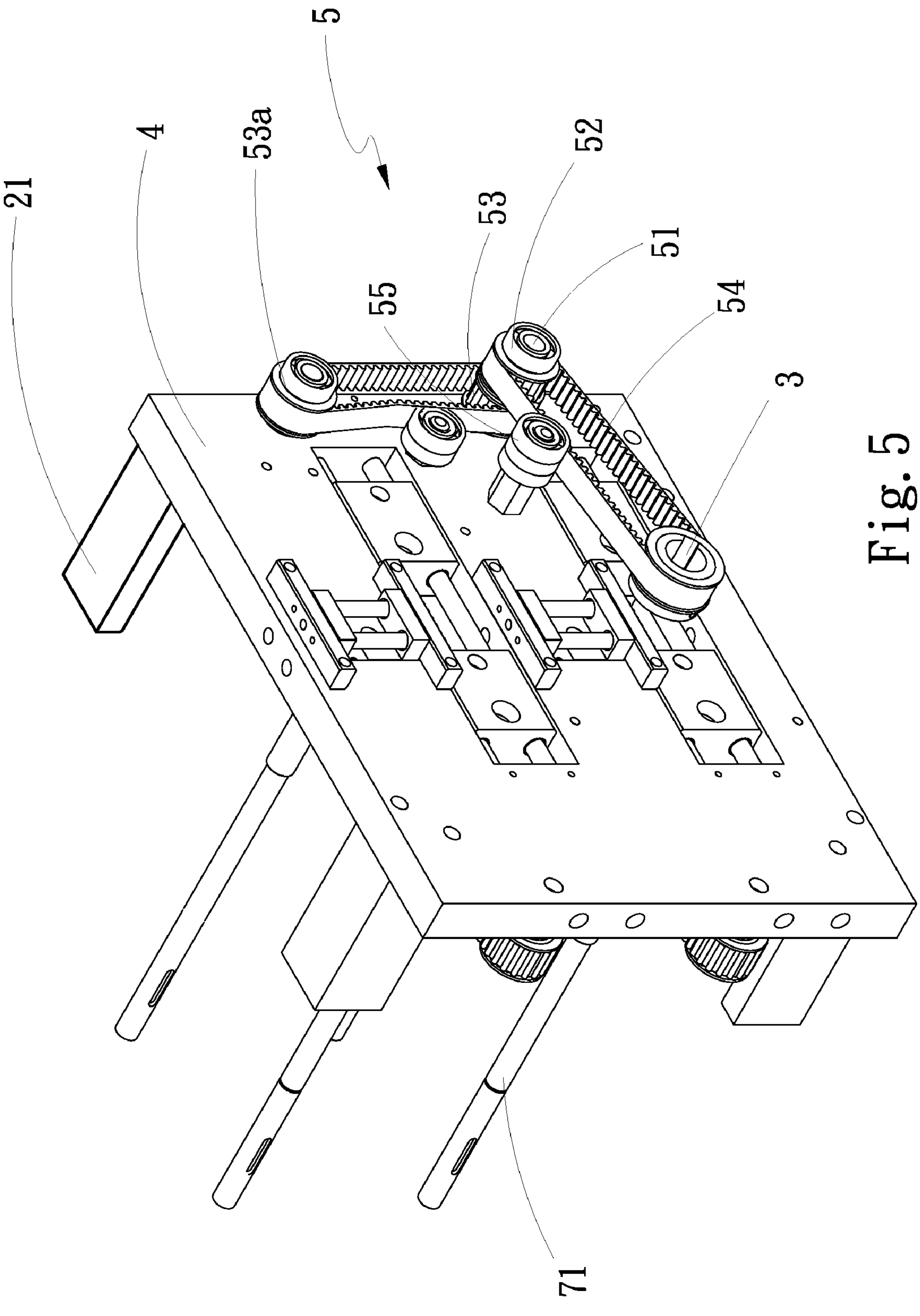
FIG. 5 is a rear perspective view of the driving mechanism of the labeling machine of the invention.

Referring to FIGS. 4 and 5, the linking assembly 5 runs through the base 4 and is anchored thereon. It includes an actuation shaft 51, an actuation wheel 52, a linking wheel 53, a linking member 54 and an idler pulley 55. The actuation shaft 51 runs through the base 4. The actuation wheel 52 and the linking wheel 53 have teeth formed on the perimeters thereof, and are located on a back side of the base 4 and coupled on one end of the actuation shaft 51. The linking member 54 may be a belt and is annular with teeth formed on an inner side. The idler pulley 55 is located on the base 4 and has the perimeter engaging with the linking member 54 to push the linking member 54 to adjust the tension thereof.

The driving wheel 3 is connected to the power source such as the electric motor and the linking assembly 5 by engaging with the actuation wheel 52 thereof through the teeth formed thereon.

Referring to FIGS. 4, 5 and 6, the transmission assembly 6 is mounted onto the base 4 and connected to the linking assembly 5. It includes a transmission wheel 61, a transmission member 62, a driven wheel 63, two sets of axle wheels 64 and two sets of pushing wheels 65. The transmission wheel 61 has teeth formed on the perimeter and is coupled on another end of the actuation shaft 51 run through the front side of the base 4, and rotates concurrently with the actuation wheel 52 and the linking wheel 53. The transmission member 62 may be an annular belt with teeth formed on two sides to couple and engage with the teeth of the transmission wheel 61. The driven wheel 63 is mounted onto the base 4 and engages with the transmission member 62. The two sets of axle wheels 64 and pushing wheels 65 have teeth formed on the perimeters, and are located respectively on the anchor dock 421 of the two sliders 42. The axle wheels 64 and pushing wheels 65 are spaced from each other to form a desired gap between them to allow the transmission member 62 to pass through. The pushing wheels 65 provide pressing to make the transmission member 62 in close contact with the axle wheel 64. The teeth on one side of the transmission member 62 engage with the teeth of the axle wheels 64 and the teeth on another side thereof engage with the teeth of the pushing wheels 65. The transmission wheel 61 can drive the two sets of axle wheels 64 to move concurrently through the transmission member 62.

The axle assembly 7 includes two sets of axles 71, a set of axle adjustment member 72 and two sets of feeding wheels 73. The two axles 71 are respectively coupled with the two axle wheels 64 on the axes thereof. The axle adjustment member 72 is located on a middle portion of the axle 71. By moving the axles 71, the distance between them can be adjusted. Each feeding wheel 73 is mounted on a distal end of each axle 71.

The adjustment assembly 8 includes an adjustment dock 81 and an idler pulley 82. The adjustment assembly 8 is located on the base 4 and engages with the transmission member 62 of the transmission assembly 6. The idler pulley 82 also engages with the transmission member 62. The position of the idler pulley 82 can be adjusted through the adjustment dock 81 to push the transmission member 62 to adjust the tension thereof.

Figure 2:
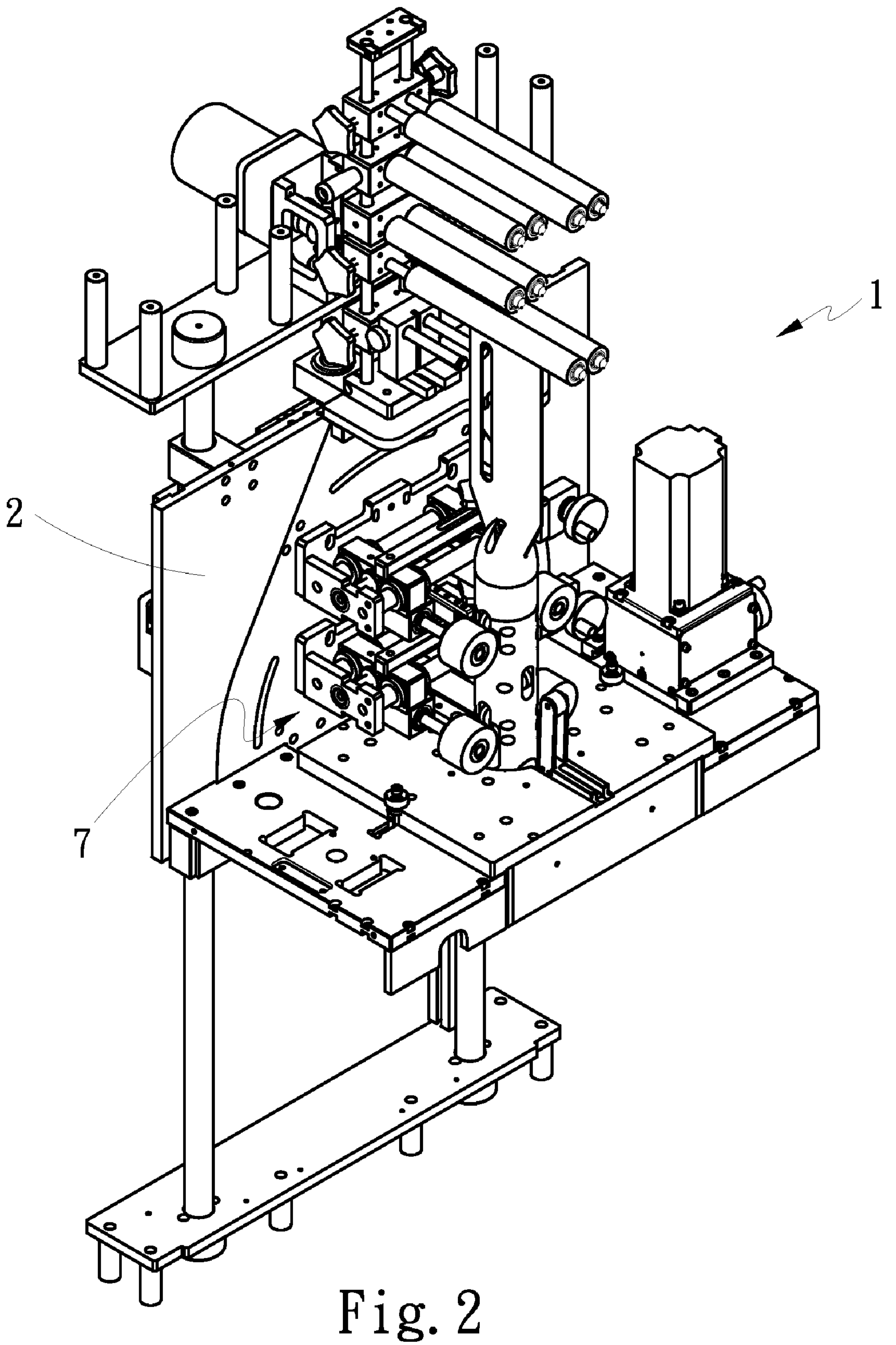
FIG. 2 is a perspective view of the labeling machine of the invention.
Figure 7:
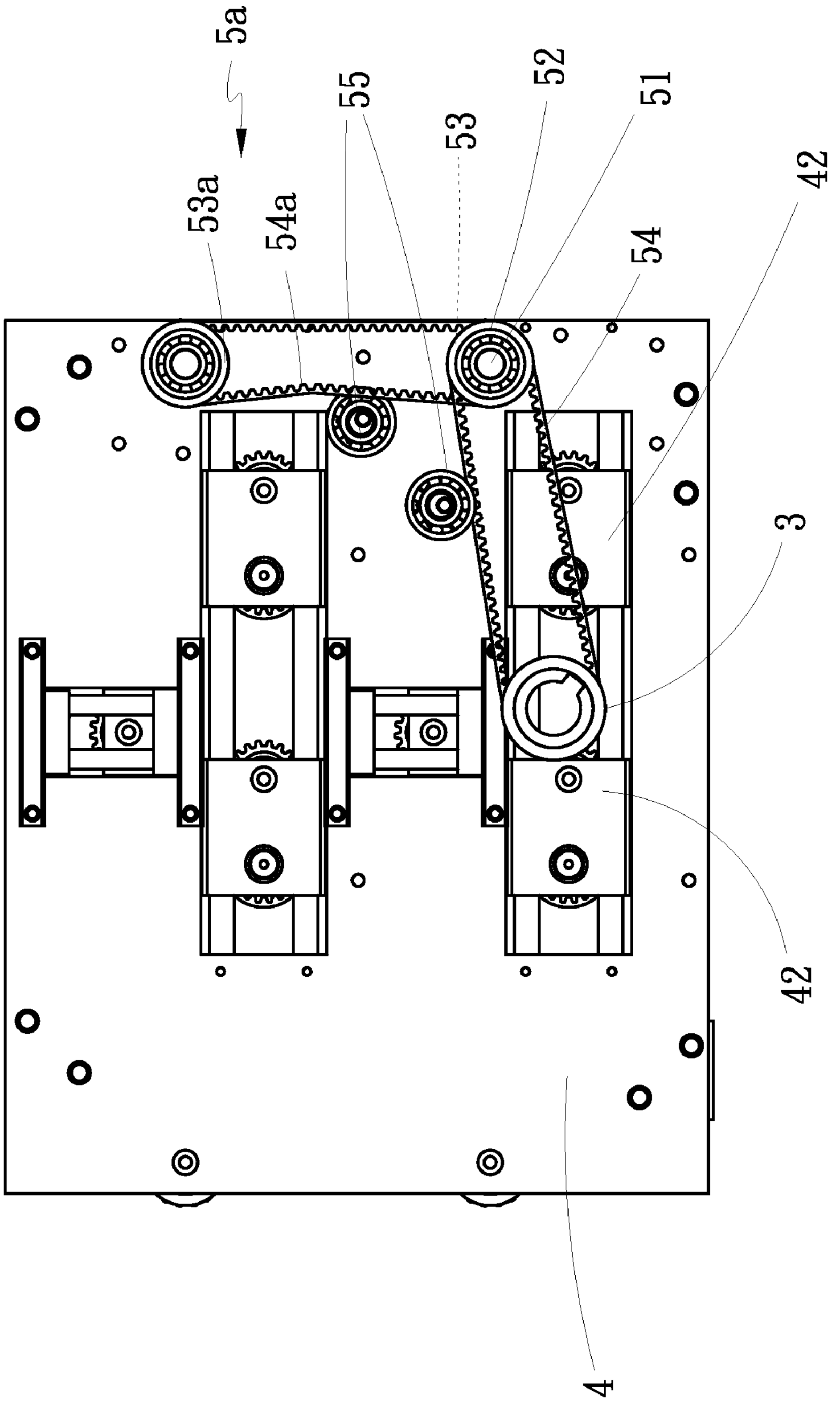
FIG. 7 is a rear view of the driving mechanism of the labeling machine of the invention.

Referring to FIGS. 2, 6 and 7, when the driving wheel 3 is driven by the power source, the motion is transmitted to the actuation wheel 52 through the linking member 54. Through the actuation shaft 51, the transmission wheel 61 of the transmission assembly 6 is rotated concurrently to drive the transmission member 62; hence the two sets of axle wheels 64 engaged with the transmission member 62 also are driven to rotate in opposite direction at the same time.

When the linking wheel 53 is removed from the actuation shaft 51, the driving wheel 3 is connected to the actuation wheel 52 merely through the linking member 54 and drives only one transmission assembly 6, hence the two axle wheels 64 are driven through a single driving fashion.

When two sets of the driving mechanisms of the invention are installed, the labeling machine 1 can be driven through a dual driving fashion. In such a circumstance, an extra idler pulley 55 is installed on the base 4, and the linking member **54*a* on the second linking assembly 5*a* is adjusted. No adjustment is required for the first set of the linking assembly. The linking member 54 is connected to one actuation wheel 52 and the driving wheel 3. The linking member 54*a* of the second linking assembly 5*a* is connected to the linking wheel 53 of the first linking assembly 5 and the linking wheel 53*a* of the second linking assembly 5*a*. And the linking member 54*a* of the second linking assembly 5*a* is pushed by the idler pulley 55 to keep the linking member 54*a* at a desired tension. Then the two sets of linking assemblies 5 and 5*a* can be driven concurrently by the driving wheel 3. As previously discussed, when the two sets of linking wheels 53 and 53*a* of the two linking assemblies 5 and 5*a* rotate, a dual driving fashion is formed to drive concurrently the two transmission assemblies 6 and 6*a***.

To do repair and maintenance of the transmission member 62 of the transmission assembly 6, only the transmission member 62 needs to be removed from the base 4, and a replacing transmission member 62 can be coupled between the transmission wheel 61 and driven wheel 63. Then the transmission member 62 can respectively pass through the gap between the axle wheel 64 and pushing wheel 65 on the two sliders 42 with the teeth of the transmission member 62 respectively engaging with the teeth of the axle wheels 64 on the two sliders 42. Then the idler pulley 82 of the adjustment assembly 8 can be adjusted to control the tension of the transmission member 62 to finish the replacement process. Replacement of the linking member 54 can be accomplished by removing merely the linking member 54 from the actuation wheel 52 or linking wheel 53 and mounting a replacing linking member 54.

What is claimed is:

1. A driving mechanism for a labeling machine, comprising a driving wheel connecting to a power source of an electric motor, a base, a linking assembly, a transmission assembly, an axle assembly and an adjustment assembly, wherein:

the base is fastened to a chassis of the labeling machine through an angular post and includes at least one sliding track which has two sliders located thereon corresponding to each other;

the linking assembly is located on and runs through the base and at least includes an actuation shaft, an actuation wheel, a linking wheel and a linking member, the actuation wheel and the linking wheel being fixedly coupled on one end of the actuation shaft, the actuation shaft having other end running through the base, the linking member is annular and engaged with the actuation wheel and the driving wheel;

the transmission assembly is mounted onto the base and connected to the linking assembly, and at least includes a transmission wheel, a transmission member, two sets of axle wheels corresponding to each other and two sets of pushing wheels corresponding to each other; the transmission wheel being fixedly coupled on the other end of the actuation shaft which runs through the base and turnable concurrently with the actuation wheel and the linking wheel, the transmission member is annular and coupled and engaged with the transmission wheel, two sets of axle wheels and two sets of pushing wheels are located respectively on the two sets of sliders, the axle wheels and the pushing wheels are spaced from each other at a selected gap to allow the transmission member to pass through, the transmission member is engaged with the pushing wheels and the axle wheels, the transmission wheel and the axle wheels and the pushing wheels are bridged by the transmission member so that the axle wheels on the two sliders are turnable concurrently;

the axle assembly is located on the axle wheels of the transmission assembly; and the adjustment assembly is located on the base and engages with the transmission member of the transmission assembly and has an idler pulley to adjust the tension of the transmission member.

2. The driving mechanism of claim 1, wherein the sliders are slidable leftwards and rightwards on the sliding track and form an adjustable interval therebetween.

3. The driving mechanism of claim 1, wherein the axle assembly includes two axles and an axle adjustment member to adjust the interval formed between the two axles to drive the two sliders to desired locations.

4. The driving mechanism of claim 3, wherein the axles are fixedly located on the axes of the axle wheels.

5. The driving mechanism of claim 1, wherein the axle wheels and the pushing wheels have teeth formed on the perimeters thereof.

6. The driving mechanism of claim 1, wherein the transmission member is an annular belt and has teeth formed on two sides thereof.

7. The driving mechanism of claim 1, wherein the transmission wheel is removed by the actuation shaft to form single driving transmission.

8. The driving mechanism of claim 1, wherein the transmission wheel linked to the transmission assembly is coupled by the linking member of another transmission assembly to form multiple transmission assemblies coupled in series.

* * * * *